United States Patent
Yi et al.

(10) Patent No.: US 12,359,295 B2
(45) Date of Patent: Jul. 15, 2025

(54) PRE-COATED STEEL SHEET WITH ALUMINUM OR ALUMINUM ALLOY PRE-COATING, MANUFACTURING METHOD AND HOT STAMPED COMPONENTS

(71) Applicant: IRONOVATION MATERIALS TECHNOLOGY CO., LTD., Jiangsu (CN)

(72) Inventors: Hongliang Yi, Liaoning (CN); Shu Zhou, Shanghai (CN); Zeran Hou, Jiangsu (CN); Xiaochuan Xiong, Jiangsu (CN)

(73) Assignee: Ironovation Materials Technology Co., Ltd., Jiangsu (CN)

( * ) Notice: Subject to any disclaimer, the term of this patent is extended or adjusted under 35 U.S.C. 154(b) by 0 days.

(21) Appl. No.: 18/024,384

(22) PCT Filed: Oct. 28, 2020

(86) PCT No.: PCT/CN2020/124190
§ 371 (c)(1),
(2) Date: Mar. 2, 2023

(87) PCT Pub. No.: WO2022/047956
PCT Pub. Date: Mar. 10, 2022

(65) Prior Publication Data
US 2024/0026513 A1  Jan. 25, 2024

(30) Foreign Application Priority Data
Sep. 4, 2020  (CN) .......................... 202010918859.6

(51) Int. Cl.
 C22C 38/06  (2006.01)
 B21D 22/02  (2006.01)
(Continued)

(52) U.S. Cl.
 CPC .............. *C23C 2/12* (2013.01); *B21D 22/022* (2013.01); *C21D 1/76* (2013.01); *C21D 8/0257* (2013.01);
(Continued)

(58) Field of Classification Search
 CPC ......... C22C 38/06; C22C 38/34; C22C 38/42; C22C 38/44; C22C 38/54; C22C 38/58
(Continued)

(56) References Cited

U.S. PATENT DOCUMENTS

| 9,234,253 B2 | 1/2016 | Warnecke et al. |
| 2017/0260599 A1 | 9/2017 | Puerta Velasquez et al. |
| 2021/0095368 A1 | 4/2021 | Fujita et al. |

FOREIGN PATENT DOCUMENTS

| CN | 102652177 A | 8/2012 |
| CN | 104769138 A | 7/2015 |

(Continued)

OTHER PUBLICATIONS

Chen et al., CN-110965002-A espace machine translation of description printed Jul. 24, 2024, Apr. 7, 2020, entire description (Year: 2020).*

(Continued)

*Primary Examiner* — Katherine A Christy
(74) *Attorney, Agent, or Firm* — Morgan, Lewis & Bockius LLP (57) ABSTRACT

Pre-coated steel sheet with aluminum or aluminum alloy pre-coating, manufacturing method and hot stamped components, where the method for manufacturing a pre-coated steel sheet with aluminum or aluminum alloy pre-coating relates to the situation of $0.10\% \leq C_0 \leq 0.30\%$, the dew point of the mixed atmosphere is controlled in the range of $-40 \sim -15°$ C. and, where it relates to the situation of $0.30\% < C_0 \leq 0.50\%$, the dew point of the mixed atmosphere (Continued)

is controlled in the range of −36~−12° C. A pre-coated steel sheet with aluminum or aluminum alloy pre-coating is obtained by the method and hot stamping components are obtained by the pre-coated steel sheet. The improved toughness and VDA peak force are achieved for the hot stamping components and then the collision safety of hot stamping components is elevated.

7 Claims, 5 Drawing Sheets

(51) Int. Cl.
| | | |
|---|---|---|
| C21D 1/76 | (2006.01) | |
| C21D 8/02 | (2006.01) | |
| C21D 9/46 | (2006.01) | |
| C22C 38/34 | (2006.01) | |
| C22C 38/42 | (2006.01) | |
| C22C 38/44 | (2006.01) | |
| C22C 38/54 | (2006.01) | |
| C22C 38/58 | (2006.01) | |
| C23C 2/12 | (2006.01) | |
| C23C 2/20 | (2006.01) | |

(52) U.S. Cl.
CPC ............... *C21D 9/46* (2013.01); *C22C 38/06* (2013.01); *C22C 38/34* (2013.01); *C22C 38/42* (2013.01); *C22C 38/44* (2013.01); *C22C 38/54* (2013.01); *C22C 38/58* (2013.01); *C23C 2/20* (2013.01)

(58) Field of Classification Search
USPC .......................................................... 428/653
See application file for complete search history.

(56) References Cited

FOREIGN PATENT DOCUMENTS

| CN | 110777319 A | 2/2020 |
|---|---|---|
| CN | 110965002 A | 4/2020 |
| CN | 111778467 A | 10/2020 |
| EP | 2984198 A1 | 2/2016 |
| WO | 2014/166630 A1 | 10/2014 |

OTHER PUBLICATIONS

International Search Report (with partial translation) and Written Opinion dated May 27, 2021, issued in corresponding International Patent Application No. PCT/CN2020/124190.

\* cited by examiner

PRE-COATED STEEL SHEET WITH ALUMINUM OR ALUMINUM ALLOY PRE-COATING, MANUFACTURING METHOD AND HOT STAMPED COMPONENTS

TECHNICAL FIELD

The present invention relates to a pre-coated steel sheet with aluminum or aluminum alloy pre-coating, manufacturing method and hot stamped components.

BACKGROUND

The application percentage of hot stamping steel in automotive materials is increasing year by year, and accordingly, the requirements of strength and toughness of hot stamped steels are getting higher and higher in automotive industry. The static three-point bending test (i.e., the bending experiment, VDA 238-100 Standard) is usually used to evaluate the toughness of material. The toughness of steel sheet and the ability to resist the deformation failure can be reflected by the bending angle achieved when the steel sheet reaches the maximum bending load. Meantime, the room temperature tensile test (GB/T 228.1 Standard) can be used to characterize the strength of material. And the tensile strength can be reflected by the ability to resist the tensile deformation failure.

As we all known, the toughness of material will decrease as the increase of strength. Therefore, those skilled in the art have been researching how to improve the toughness of hot stamped steel while ensuring its high strength. For example, EP2984198A1, CN102652177A and CN104769138A. Those all make the final products with the high tensile strength and good toughness by controlling the decarburization of the surface of the substrate steel sheet.

A hot stamped component with coating is involved in EP2984198A1. It enlightens in this literature that a decarburization layer of 20~50 μm is formed on the surface of the substrate steel sheet at a dew point above −20° C. (e.g. −15~5° C.) before coated. And this contributes to prevent the formation of micro-crack in the substrate steel sheet during hot stamping. At the meantime, the low carbon zone (carbon content below 0.01%, that is complete decarburization) with the thickness of 5~30 μm is still being between the substrate steel sheet and the metal effected zone of its coating. And it has good ductility, which is helpful to eliminate the stress in the hot forming and/or cooling process, and then improves plasticity and toughness of final product.

One method to manufacture the flat steel product with good formability is provided in CN102652177A. It is indicated that no decarburization zone can be found in the microstructure of the sample which is annealed at the atmosphere dew point of −30° C. Therefore, in order to obtain the extensible decarburization edge layer in the surface of flat steel, the atmosphere dew point during annealing is controlled in the range of −20~60° C. The microstructure in the decarburization edge layer is ferrite and its maximum hardness is 75% of the central hardness of flat steel products. And then it is avoided that the danger of cracks or notches occurs in the surface of steel products in the forming process.

The method to manufacture coated steel parts with press hardening is provided in CN104769138A. Likewise, it is found that the decarburization zone with the p50% depth in the range of 6-30 μm is formed in substrate steel sheet before the 22MnB5 pre-coating and it is helpful to achieve the high bendability. Wherein, the p50% depth is the depth of position in which the carbon content is 50% of the substrate steel sheet. Besides, it is indicated that the bending angle of the sample is less than 55° unexpectedly when the dew point is below −15° C. and the bending angle of VDA decreases rapidly as the dew point drops. Therefore, in order to ensure the desired bending angle and the critical bending angle of 22MnB5 higher than 55°, it is demanded that the dew point is not less than −15° C. It is namely that the p50% depth is not less than 6 μm.

The toughness of the final hot stamped components can be improved by using the surface decarburization of the substrate steel sheet as the technology mentioned above. But it is noted that the unfavourable effect of surface decarburization on the ability of hot stamped components to resist deformation failure during the collisions is not discerned in the prior art. Since the thickness of decarburization layer is far low than that of substrate steel sheet, therefore it is generally assumed that the effect of decarburization layer on the tensile strength is negligible. And then it is generally assumed that the effect of decarburization layer on the ability of hot stamped components to resist deformation failure during the collisions is also negligible. However, it is found by the inventor by accident that it is not true. On the contrary, there is the significantly effect of the decarburization layer on the ability of hot stamped components to resist bending deformation failure, in particular of the maximum bending load (i.e. the peak force corresponding to the VDA bending angle, Hereinafter referred to as VDA peak force). Then the collision safety of hot stamped components is influenced. Therefore, it is unreasonable to evaluate the collision safety of hot stamping components only by using VDA bending angle and tensile strength. The variation of VDA peak force should be taken a full account.

Based on the above problem, the present invention desires to obtain a pre-coated steel sheet with aluminum or aluminum alloy pre-coating, manufacturing method thereof and hot stamped components. Compared with the hot stamped components with similar tensile strength in the prior art, the final hot stamped components achieved not only have the high toughness (VDA bending angle), but also have the high maximum bending load (VDA peak force). The collision safety of hot stamped components will be improved accordingly.

SUMMARY OF THE INVENTION

The present invention provides a method for manufacturing a pre-coated steel sheet with aluminum or aluminum alloy pre-coating. Then the hot stamping components made by the pre-coated steel sheet have the excellent strength and toughness. The coating method according to the present invention comprises:

a) Decarburization: the substrate steel sheet is heated to the temperature in the range of 740~880° C. in the atmosphere of $H_2$ and $N_2$ with the $H_2$ volume percentage of 2~12%. Preferably, the duration time is in the range of 30~300 s at the first temperature of 740~880° C. Wherein, the carbon content $C_0$ of substrate steel sheet is in the range of 0.10~0.50% and the manganese content is in the range of 0.50~10%. As for $0.10\% \leq C_0 \leq 0.30\%$, the dew point of the atmosphere should be controlled in the range of −40~−15° C. and as for $0.30\% \leq C_0 \leq 0.50\%$, the dew point of the atmosphere should be controlled in the range of −36~−12° C.;

b) Hot dipping: the heated substrate steel sheet is cooled to the second temperature in the range of 610~680° C. and then dipped in the solution of temperature in the range of 610~680° C.;

c) after the substrate steel sheet is out of the coating solution and before the coating solution on at least one surface solidifies, removing excessive coating solution on the at least one surface by air knife purge to control a pre-coating thickness $w_1$ on the at least one surface; and d) cooling the steel sheet to room temperature to obtain a pre-coated steel sheet with the aluminium and aluminium alloy pre-coating. Wherein, the thickness $w_1$ of pre-coating is 5~20 μm, the thickness of pre-coated steel sheet is 0.5~3.0 mm, preferably 0.7~2.3 mm, more preferably 0.8~2.0 mm.

The coating solution comprises by weight: 9~12% Si, no more than 4% Fe, the balance of Al and unavoidable impurities.

Preferably, as for $0.10\% \leq C_0 \leq 0.30\%$, the dew point of atmosphere should be controlled in −35~−17° C., more preferably −31~−19° C.

Preferably, as for $0.30\% \leq C_0 \leq 0.50\%$, the dew point of atmosphere should be controlled in −30~−15° C., more preferably −27~−17° C.

The present invention provides a pre-coated steel sheet with aluminum or aluminum alloy pre-coating. The total thickness of steel sheet is 0.5~3.0 mm, preferably 0.7~2.3 mm, more preferably 0.8~2.0 mm. The pre-coated steel sheet is consisted of substrate steel sheet and at least one surface of substrate steel sheet with aluminum or aluminum alloy pre-coating.

The carbon content $C_0$ of substrate steel sheet is in the range of 0.10~0.50% and the manganese content is in the range of 0.50~10%.

The thickness $w_1$ of pre-coating is 5~20 μm. Wherein, the Al content is not less than 60% by mass.

The initial low carbon zone exists in the substrate steel plate adjacent to the interface between the substrate steel sheet and the pre-coating.

(1) As for $0.10\% \leq C_0 \leq 0.30\%$,
a) the carbon content $C_{1a}$ of the position in the substrate steel sheet where the distance from the interface is 6 μm is content with 53% $C_0 \leq C_{1a} \leq C_0$; and
b) the carbon content $C_{1b}$ of the position in the substrate steel sheet where the distance from the interface is 10 μm is content with 75% $C_0 \leq C_{1b} \leq C_0$, and $C_{1b} > C_{1a}$;
preferably 59% $C_0 \leq C_{1a} \leq 90\% C_0$, at the meantime, 77.5% $C_0 \leq C_{1b} \leq 95\% C_0$ and $C_{1b} > C_{1a}$;
more preferably 64% $C_0 \leq C_{1a} \leq 82\% C_0$, at the meantime, 80% $C_0 \leq C_{1b} \leq 91.5\% C_0$ and $C_{1b} > C_{1a}$;

(2) As for $0.30\% \leq C_0 \leq 0.50\%$,
a) the carbon content $C_{2a}$ of the position in the substrate steel sheet where the distance from the interface is 6 μm is content with 42% $C_0 \leq C_{2a} \leq 87\% C_0$; and
b) the carbon content $C_{1b}$ of the position in the substrate steel sheet where the distance from the interface is 10 μm is content with 65% $C_0 \leq C_{2b} \leq 95\% C_0$, and $C_{2b} > C_{2a}$;
preferably 50% $C_0 \leq C_{2a} \leq 75\% C_0$, at the meantime, 70% $C_0 \leq C_{2b} \leq 86\% C_0$ and $C_{2b} > C_{2a}$;
more preferably 55% $C_0 \leq C_{1a} \leq 70\% C_0$, at the meantime, 75% $C_0 \leq C_{2b} \leq 85\% C_0$.

The substrate steel sheet comprises the following constituents by mass: 0.10~0.50%, C, 0.5~10% Mn, 0~0.01% B, 0~0.4% Nb+Ti+V, 0.1~2% Si, 0.1~2% Al, 0.01~5% Cr+Ni+Mo+Cu and 0~2% Cr, 0~2% Ni, 0~2% Mo and 0~2% Cu, and the balance of Fe and unavoidable impurity elements.

The present invention also provides the hot stamping components with aluminum or aluminum alloy pre-coating. The total thickness of hot stamping components is 0.5~3.0 mm, preferably 0.7~2.3 mm, more preferably 0.8~2.0 mm. From inside to outside, the hot stamping components comprise:

the substrate steel sheet, the carbon content of substrate steel sheet is in the range of 0.1~0.50% and the manganese content is in the range of 0.50~10%; and Aluminum or aluminum alloy coating, its thickness is 10~26 μm and comprises: interdiffusion layer adjacent to the substrate steel sheet, the thickness of interdiffusion layer is 6~14 μm and it includes the Al-containing ferrite, wherein the Fe content is not less than 70% by weight, and the Fe—Al intermetallic compound layer outside of the interdiffusion layer;

As for the hot stamping components whose carbon content is $0.10\% \leq C_0 \leq 0.30\%$ and tensile strength is 1300~1800 MPa, the hardness HV1 of the position in the substrate steel sheet where the distance from the interface between substrate steel sheet and coating is less than 6 μm is 0.65~1.07 time of the substrate steel sheet core hardness HV2 and its value is in the range of 400~550 HV. As for the hot stamping components whose carbon content is $0.30\% \leq C_0 \leq 0.50\%$ and tensile strength is more than 1800 MPa, the HV1 is 0.6~1.0 time of HV2 and its value is more than 550 HV. Preferably, the bending fracture strain of hot stamping components with the tensile strength in the range of 1300~1800 MPa is not less than 0.283 and its VDA peak force is not less than 98% of peak force of the pre-coated steel sheet with the same composition and no decarburization after the same hot stamping process. The bending fracture strain of hot stamping components with the tensile strength more than 1800 MPa is not less than 0.21 and its VDA peak force is not less than 97% of peak force of the pre-coated steel sheet with the same composition and no decarburization after the same hot stamping process.

Preferably, as for the hot stamping components with tensile strength of 1300~1800 MPa, the $HV_1$ is 0.7~1.0 time of $HV_2$; as for the hot stamping components with tensile strength more than 1800 MPa, the $HV_1$ is 0.65~0.9 time of $HV_2$. More preferably, the bending fracture strain of hot stamping components with the tensile strength in the range of 1300~1800 MPa is not less than 0.30 and its VDA peak force is higher than that of the pre-coated steel sheet with the same composition and no decarburization after the same hot stamping process. The bending fracture strain of hot stamping components with the tensile strength more than 1800 MPa is not less than 0.23 and its VDA peak force is not less than 99% of peak force of the pre-coated steel sheet with the same composition and no decarburization after the same hot stamping process.

More preferably, as for the hot stamping components with tensile strength of 1300~1800 MPa, the $HV_1$ is 0.75~0.95 time of $HV_2$; As for the hot stamping components with tensile strength more than 1800 MPa, the $HV_1$ is 0.68~0.85 time of $HV_2$. Further preferably, the bending fracture strain of hot stamping components with the tensile strength in the range of 1300~1800 MPa is not less than 0.31 and its VDA peak force is at least 2% higher than that of the pre-coated steel sheet with the same composition and no decarburization after the same hot stamping process. The bending fracture strain of hot stamping components with the tensile strength more than 1800 MPa is not less than 0.24 and its VDA peak force is higher than that of the pre-coated steel sheet with the same composition and no decarburization after the same hot stamping process.

The values of $HV_1$ and $HV_2$ are the 10-point averages of Vickers hardness values measured using a load force of 5 g.

The initial low carbon zone formed in the surface of the substrate steel sheet is controlled before the steel sheet is pre-coated in the present invention. Then the toughness of the final component is not only improved, but also the remarkable decreasing of the tensile strength and the maximum bending load of the component are avoided. The controlling of the initial low carbon zone is not only based on the expected VDA bending angle and the tensile strength, but also based on the VDA peak force. It will be explained in detail as follows.

The initial interface between the substrate steel sheet and the pre-coated will move into the side of the substrate steel sheet with the formation of the interdiffusion layer during hot stamping process. Then, compared with the thickness of the pre-coating before hot stamping, the thickness of the coating will be increased after hot stamping. Since the solubility of the carbon atoms in the Al-containing ferrite and Fe—Al compound is very low, the carbon atoms will not move into the side of the coating during interface movement. Therefore, the carbon atoms only diffuse into the side of the substrate steel sheet and are enrichment in the substrate steel sheet near the interface between the final coating and the substrate steel sheet. The obvious carbon enrichment zone is formed. The brittle high-carbon martensite microstructure is generated in the carbon enrichment zone during cooling and will crack first in the static bending test. Hence, the toughness of the final component is greatly damaged. In addition, the strength of hot stamping steel is usually improved by increasing the carbon content in the steel to meet the needs of lightweight. With the increasing of carbon content in the substrate steel sheet, the damage of high-carbon martensite due to the enrichment of carbon to the toughness of final components will be more obvious. In order to improve the toughness of high strength hot stamping components with Al—Si coating, it is necessary to suppress or even eliminate the carbon enrichment during hot stamping. The present invention proposes that the initial low carbon zone is formed on the surface of the substrate steel sheet and then the coating is carried out during the production process of the pre-coated steel sheet. In this case, the movement of the initial interface caused by the interdiffusion first occurs in the low carbon zone. The existence of the initial low carbon zone makes it that the few carbon atoms in the newly formed diffusion layer diffuse into the side of the substrate sheet and enrich. Hence, the generation of the brittle high-carbon martensite is drastically decreased and then the damage of the brittle high-carbon martensite to the toughness of hot stamping component is also weakened.

In addition, it has been noted by the inventors that the failure occurs first on the outermost surface of the bending when the materials or components which are the different thickness and strength undergo bending deformation. The reason is that the outer surface is always affected by the tensile stress at the state of bending. Then the outer surface cracks and results into fracture when the bending load reaches the limit. At this moment, the limiting strain reached by the outer surface is called bending fracture strain and the corresponding bending angle is called VDA bending angle. Therefore, as same as the VDA bending angle, the bending fracture strain also can be used to characterize the toughness of materials or components. But the difference is that it is only relation with the outermost surface state of materials or components and has no thing with the thickness of materials. Hence, the bending fracture strain is used to characterize the toughness of components and the initial low carbon zone is controlled by the expected bending fracture strain in present invention.

As mentioned above, the effect of low carbon zone on the strength of hot stamping components is often ignored in the prior art. As for the hot stamping components, the alloying coating on its surface is the Fe—Al intermetallic compound. the hardness of alloying coating can be as high as 800~1000 HV and it is very brittle. The plasticity and toughness of it are poor and then it will crack during hot stamping, leading to a significant number of microcracks. In relative terms, the interdiffusion layer near the substrate steel sheet is the relatively soft high-Al and carbon-free ferrite. The plasticity and toughness of ferrite are very good and the strength is low. Since the coating on the surface of component usually cannot play the role of bearing the tensile load during tensile test. That is to say, the applied load is still carried by the substrate steel sheet. The stress state of the substrate steel sheet is still consistent with that of no decarburization during the tensile process when there is a low carbon zone from the interface between the substrate steel sheet and the coating to the near interface zone in the substrate steel sheet. Hence, the effect of low carbon zone on the tensile strength is in the line with the classic law of mixing. Namely, the tensile strength of hot stamping components will be decrease linearly with the thickness of low carbon zone increasing. The thickness of low carbon zone is generally several microns to tens of microns whereas the thickness of substrate steel sheet is a few millimetres. The thickness of low carbon zone is far smaller than that of substrate steel sheet. Hence the effect of the thickness of low carbon zone on the tensile strength is usually ignored in the prior art.

However, it is found by the inventors that it is not reasonable to evaluate the collision safety of the hot stamping component just by the tensile strength and VDA bending angle. On the one hand, the microstructure of the surface and the central of the hot stamping components made by the Al—Si coated steel sheet is different. On the other hand, the components have severe plastic deformation in the local micro-zone corresponding to the indenter and then will be failure because the diameter of bending indenter and the spacing between back-up rolls are both small in the VDA bending test. Hence, the ability of resisting local deformation failure can be reflected by the VDA bending test. This test is also called the ultimate tip cold bending test. It is unreasonable to characterize the collision safety of the hot stamping components using the tensile strength achieved by tensile test and VDA bending angle achieved by VDA bending test due to the various possible situations when vehicle collisions occur. Hence, it is put forward by the inventors that a sufficiently high VDA peak force is also indispensable in order to evaluate the collision safety of the hot stamping components. But the effect of surface decarburization on the VDA peak force of the hot stamping components is not paid attention in the prior art yet.

According to the invention, the bending moment of the bending indenter $M_1$ satisfies the equation (1) when the bending test of the components is carried out:

$$M_1 = \frac{F\left(0.5L + R - (R+r)\sin\left(\frac{\alpha}{2}\right)\right)}{2\cos^2\left(\frac{\alpha}{2}\right)} \quad (1)$$

wherein, F is the bending load, L is the spacing of back-up, R is diameter of back-up, r is the radius of the bending indenter, α is the bending angle.

At the meantime, the bending moment of deformation zone $M_2$ satisfies the equation (2) when the bending test of components is carried out:

$$M_2 = \frac{1}{4}\sigma(y)t^2 W$$

wherein, σ(y) is the stress of components when bending deformation is carried out, W is the width of components, t is the thickness of components.

Since the bending moment of equation (1) is equal to that of equation (2), the maximum bending load (i.e., VDA peak force) satisfies the equation (3) when the bending angle α reaches the maximum bending angle $\alpha_{max}$ (i.e., the VDA bending angle when no decarbonation is found on the surface of substrate steel sheet):

$$F_{max} = \frac{W\cos^2\left(\frac{\alpha_{max}}{2}\right)t^2\sigma(y)}{2\left(0.5L + R - (R+r)\sin\left(\frac{\alpha_{max}}{2}\right)\right)} \quad (3)$$

As for the hot stamping components with a certain thickness, there is a low carbon zone with the $t_1$ thickness in the surface of substrate steel sheet. The low carbon zone in the surface of the components will not be failure at first when the bending deformation is carried out because it is the low strength, good plasticity and toughness. Instead, the subsurface layer will reach the tensile strength and fracture. Therefore, it can be seen from the equation (3) that the VDA peak force should satisfy the equation (4) and equation (5) when the low carbon zone is being in the surface:

$$F_{peak} = f(\alpha)\left(1 - \frac{t_1}{t}\right)^2 F_{max} \quad (4)$$

$$f(\alpha) = \left(\frac{\cos\frac{\alpha_{peak}}{2}}{\cos\frac{\alpha_{max}}{2}}\right)^2 \left(1 + \frac{(R+r)\left(\sin\left(\frac{\alpha_{peak}}{2}\right) - \sin\left(\frac{\alpha_{max}}{2}\right)\right)}{0.5L + R - (R+r)\sin\left(\frac{\alpha_{peak}}{2}\right)}\right) \quad (5)$$

wherein, $F_{peak}$ is the VDA peak force when the low carbon zone is being in the surface of substrate steel sheet, $\alpha_{peak}$ is the VDA bending angle when the low carbon zone is being in the surface of substrate steel sheet. Such as t is 1.4 mm, it can be seen from the VDA238-100 standard that L is 3.3, R is 15 and r is 0.4. As for the those skilled in the art, the VDA bending angle $\alpha_{max}$ of the uncoated hot stamping steel 22MnB5 which no decarbonation is being in the surface and its tensile strength is 1500 MPa can reach 60°. Therefore, the equation (5) can convert to equation (6):

$$f(\alpha_{peak}) = i\frac{1 - \sin^2\left(\frac{\alpha_{peak}}{2}\right)}{1.395 - 1291\sin\left(\frac{\alpha_{peak}}{2}\right)}$$

it can be seen from equation (6) that the value of $f(\alpha_{peak})$ is always no more than 1 when 60°≤$\alpha_{peak}$≤105°. The VDA peak force $F_{peak}$ satisfies the equation (7):

$$F_{peak} \leq \left(1 - \frac{t_1}{t}\right)^2 F_{max}$$

Namely, the VDA bending angle will be improved when the low carbon zone is in the surface of the substrate steel sheet. But the bending angle varies over a wide range, the peak force of VDA decreases more rapidly than the square relation with the increase of the thickness of low carbon zone.

In conclusion, as for the hot stamping components with aluminum or aluminum alloy pre-coating, the low carbon zone can inhibit or even eliminate the carbon enrichment in hot stamping and then the VDA bending angle and the bending fracture roughness of components will be improved. However, the VDA peak force will decrease significantly with the increasing of the thickness of low carbon zone.

In light of the above, in order to improve the collision safety of the hot stamping components, the control of low carbon zone should not only be based on the influence of surface decarburization on the tensile strength and VDA bending angle of the final components, but also on the influence of surface decarburization on the VDA peak force. Therefore, when the pre-coated steel plate is produced, by controlling the thickness of initial low carbon zone in the surface of the substrate steel sheet (i.e., controlling the range of dew point), the pre-existing initial low-carbon zone is narrowed or even no longer exists due to the occurrence of the diffusion process in the subsequent hot stamping process. Therefore, the hot stamping components obtained according to the invention has sufficient toughness, and at the same time, the tensile strength and the VDA peak force do not obviously decrease, thereby the collision safety of the components can be ensured.

In addition, it will be understood by those skilled in the art that any range or any value within the above-mentioned respective intervals is suitable for the present invention. Such as, the dew point can be taken from any range or any specific value in the range of −40∼−15° C., for example: Any range of −35∼−19° C., −31∼−20.1° C., −30∼−23° C., −29∼−20.1° C., −27∼−21° C., or any value such as −20.2° C., −21.5° C., −22.2° C., −22.8° C., −23.6° C., −24° C., −24.7° C., −25.2° C., −26° C., −26.4° C., −27° C., −28° C., −32° C.

BRIEF DESCRIPTION OF THE DRAWINGS

The Embodiments, features and advantages of the present invention will be apparent from the subsequent description taken in conjunction with the accompanying drawings, in which.

DETAILED DESCRIPTION OF THE INVENTION

It should be pointed out that the toughness can be improved by the initial low carbon zone. The reason is that the carbon enrichment due to diffusion and the formation of soft ferrite interdiffusion layer near the substrate steel sheet during hot stamping is reduced or counteracted by the initial low carbon zone. Therefore, compared with the existing pre-coated steel sheet with aluminum or aluminum alloy coating, other conditions being consistent, the toughness of the hot stamping components made of the coated steel sheet will be improved when a certain thickness of initial low carbon zone on the surface of the steel sheet is retained. However, it is noted that the toughness is improved by decarburization while a significant decrease of the peak force of VDA should be avoided. The control of the thickness of the low carbon zone, i.e., the control of the decarburization degree is proposed by the inventors to weaken or offset carbon enrichment. At the same time, the effect of carbon content of the substrate steel sheet on carbon enrichment at the subsequent hot stamping heating process is also considered. In the hot stamping process, when the steel plate has relatively high carbon content, the corresponding carbon enrichment will be serious. Therefore, it is expected to improve the decarburization degree of the surface of substrate steel sheet, that is, the carbon content in the low carbon zone should not be too high. On the contrary, the carbon enrichment can be relatively weak when the carbon content of the steel sheet is low. Hence, the decarburization degree can be appropriately reduced, that is, the carbon content in the low carbon zone in the surface can be slightly higher.

In view of above, in consideration of the relationship between the degree of decarburization and the dew point and the carbon content of the substrate steel sheet, a method of manufacturing a pre-coated steel sheet with aluminum or aluminum alloy precoated layer is provided by the present invention. It makes the hot stamping components obtained from the pre-coated steel sheet being with the excellent strength and toughness. The coating method according to the present invention comprises:

a) decarburization: the substrate steel sheet is heated to the temperature of 740~880° C. at the ambient atmosphere of $H_2$ and $N_2$ with the volume percentage of $H_2$ being 2~12%, preferably the first temperature in the range of 740~820° C. and the duration time of 30~300 s. Wherein, the carbon content $C_0$ of substrate steel sheet is in the range of 0.10~0.50% and the manganese content is in the range of 0.5~10%. As for 0.10%≤$C_0$≤0.30%, the dew point of the atmosphere should be controlled in the range of −40~−15° C. and as for 0.30%≤$C_0$≤0.50%, the dew point of the atmosphere should be controlled in the range of −36~−12° C.;

b) hot-dipping: the heated substrate steel sheet is cooled to the second temperature in the range of 610~680° C. and then dipped in the solution of temperature in the range of 610~680° C.;

c) after the substrate steel sheet is out of the coating solution and before the coating solution on at least one surface solidifies, removing excessive coating solution on the at least one surface by air knife purge to control a pre-coating thickness $w_1$ on the at least one surface; and d) cooling the steel sheet to room temperature to obtain a pre-coated steel sheet with the aluminium and aluminium alloy pre-coating. Wherein, the thickness of pre-coating is 5~20 μm, the thickness of pre-coated steel sheet is 0.5~3.0 mm, preferably 0.7~2.3 mm, more preferably 0.8~2.0 mm.

The coating solution comprises by weight: 9~12% Si, no more than 4% Fe, the balance of Al and unavoidable impurities.

In addition, in order to further improve the toughness of hot stamping components and ensure high VDA peak force, preferably, as for 0.10%≤$C_0$≤0.30%, the dew point of the atmosphere should be controlled in the range of −35~−17° C., further preferably, in the range of −31~−19° C. Preferably, as for 0.30%<$C_0$≤0.50%, the dew point of the atmosphere should be controlled in the range of −30~−15° C., further preferably, in the range of −27~−17° C.

Based on the above manufacturing method, the present invention provides the pre-coated steel sheet with aluminum or aluminum alloy pre-coating. The total thickness of steel sheet is 0.5~3.0 mm, preferably 0.7~2.3 mm, more preferably 08~2.0 mm. The pre-coated steel sheet is consisted of substrate steel sheet and at least one surface of substrate steel sheet with aluminum or aluminum alloy pre-coating, the carbon content $C_0$ of substrate steel sheet is in the range of 0.10~0.50% and the manganese content is in the range of 0.50~10%;

The thickness $w_1$ of pre-coating is 5~20 μm. Wherein, the Al content is not less than 60% by mass.

The initial low carbon zone exists within the substrate steel plate adjacent to the interface between the substrate steel sheet and the pre-coating.

(1) As for 0.10%≤$C_0$≤0.30%, a) the carbon content $C_{1a}$ of the position in the substrate steel sheet where the distance from the interface is 6 μm is content with 53% $C_0$≤$C_{1a}$≤$C_0$; and b) the carbon content $C_{1b}$ of the position in the substrate steel sheet where the distance from the interface is 10 μm is content with 75% $C_0$≤$C_{1b}$≤$C_0$, and $C_{1b}$>$C_{1a}$;

preferably 59% $C_0$≤$C_{1a}$≤90% $C_0$, at the meantime, 77.5% $C_0$≤$C_{1b}$≤95% $C_0$ and $C_{1b}$>$C_{1a}$;

more preferably 64% $C_0$≤$C_{1a}$≤82% $C_0$, at the meantime, 80% $C_0$<$C_{1b}$≤91.5% $C_0$ and $C_{1b}$>$C_{1a}$;

(2) As for 0.30%<$C_0$≤0.50%,
  a) the carbon content $C_{2a}$ of the position in the substrate steel sheet where the distance from the interface is 6 μm is content with 42% $C_0$≤$C_{2a}$≤87% $C_0$; and
  b) the carbon content $C_{1b}$ of the position in the substrate steel sheet where the distance from the interface is 10 μm is content with 65% $C_0$≤$C_{2b}$≤95% $C_0$, and $C_{2b}$>$C_{2a}$;
  preferably 50% $C_0$≤$C_{2a}$≤75% $C_0$, at the meantime, 70% $C_0$≤$C_{2b}$≤86% $C_0$ and $C_{2b}$>$C_{2a}$;
  more preferably 55% $C_0$≤$C_{1a}$≤70% $C_0$, at the meantime, 75% $C_0$≤$C_{2b}$≤85% $C_0$.

In addition, the present invention also provides the hot stamping components with aluminum or aluminum alloy pre-coating. The total thickness of the hot stamping components is 0.5~3.0 mm, preferably 0.7~2.3 mm, more preferably 0.8~2.0 mm. From inside to outside, the hot stamping components comprise:
  the substrate steel sheet, the carbon content of substrate steel sheet is in the range of 0.10~0.50% and the manganese content is in the range of 0.50~10%; and
  aluminum or aluminum alloy coating, its thickness is 10~26 μm and comprises: interdiffusion layer adjacent to the substrate steel sheet, the thickness of interdiffusion layer is 6~14 μm and it includes the Al-containing ferrite, wherein, the Fe content is more than 70% by mass, and the Fe—Al intermetallic compound layer outside of the interdiffusion layer;

As for the hot stamping components whose carbon content is 0.10%≤$C_0$≤0.30% and tensile strength is 1300~1800 MPa, the hardness HV1 of the position in the substrate steel sheet where the distance from the interface between substrate steel sheet and coating is less than 6 μm is 0.65~1.07 time of the substrate steel sheet core hardness HV2 and its value is in the range of 400~550 HV. As for the hot stamping components whose carbon content is 0.30%≤$C_0$≤0.50% and tensile strength is more than 1800 MPa, the HV1 is 0.6~1.0 time of HV2 and its value is more than 550 HV. Preferably, the bending fracture strain of hot stamping components with the tensile strength in the range of 1300~1800 MPa is not less than 0.283 and its VDA peak force is not less than 98% of peak force of the pre-coated steel sheet with the same composition and no decarburization after the same hot stamping process. The bending fracture strain of hot stamping components with the tensile strength more than 1800 MPa is not less than 0.21 and its VDA peak force is not less than 97% of peak force of the pre-coated steel sheet with the same composition and no decarburization after the same hot stamping process.

Preferably, as for the hot stamping components with tensile strength of 1300~1800 MPa, the $HV_1$ is 0.70~1.0 time of $HV_2$; as for the hot stamping components with tensile strength more than 1800 MPa, the $HV_1$ is 0.65~0.9 time of $HV_2$. More preferably, the bending fracture strain of hot stamping components with the tensile strength in the range of 1300~1800 MPa is not less than 0.30 and its VDA peak force is higher than that of the pre-coated steel sheet with the same composition and no decarburization after the same hot stamping process. The bending fracture strain of hot stamping components with the tensile strength more than 1800 MPa is not less than 0.23 and its VDA peak force is not less than 99% of peak force of the pre-coated steel sheet with the same composition and no decarburization after the same hot stamping process.

More preferably, as for the hot stamping components with tensile strength of 1300~1800 MPa, the $HV_1$ is 0.75~0.95 time of $HV_2$; As for the hot stamping components with tensile strength more than 1800 MPa, the $HV_1$ is 0.68~0.85 time of $HV_2$. Further preferably, the bending fracture strain of hot stamping components with the tensile strength in the range of 1300~1800 MPa is not less than 0.31 and its VDA peak force is at least 2% higher than that of the pre-coated steel sheet with the same composition and no decarburization after the same hot stamping process. The bending fracture strain of hot stamping components with the tensile strength more than 1800 MPa is not less than 0.24 and its VDA peak force is higher than that of the pre-coated steel sheet with the same composition and no decarburization after the same hot stamping process.

The values of $HV_1$ and $HV_2$ are the 10-point averages of Vickers hardness values measured using a load force of 5 g.
  the chemical composition is described in detail as follow:
  C: about 0.10~0.50%
  C is the most effective solution strengthening element in steel. In order to ensure the tensile strength of steel above 1300 MPa, the carbon content should be higher than or equal to about 0.10%. However, if the carbon content exceeds 0.50%, the microstructure is mainly consisted of the brittle high-carbon martensite, and its ductility and toughness are poor, and its hydrogen embrittlement resistance also decreases significantly. Therefore, the C content of the high strength steel used in the present invention is between about 0.10~0.50%.
  Mn: about 0.50~10%
  The hardenability of steel can be improved by Mn to ensure its strength. If the content of Mn is less than about 0.50%, the hardenability of steel is insufficient and it is difficult to obtain high strength. However, if the Mn content is too high, central band segregation is prone to be in the steel, which has adverse effects on the ductility and toughness of the steel. Therefore, the upper limit of the Mn content of the high-strength steel in the invention is about 10%.

The improvement of the toughness of hot stamping components mainly comes from two aspects:
  1) the interdiffusion layer of the aluminum or aluminum alloy coating. Compared with the bare sheet, the interdiffusion layer is soft ferrite with high Al content, which has better toughness and plasticity. The existence of this layer improves the toughness of hot stamping components. Through the research of the invention, it is found that the thickness of the interdiffusion layer at 6-14 μm is the best case. If the thickness of diffusion layer is less than 6 μm, the austenitizing of the matrix steel plate is insufficient, and the microstructure uniformity after cooling is poor, which affects the comprehensive properties of the final components. If the thickness of diffusion layer is higher than 14 μm, it means that the heating time of hot stamping is too long or the temperature is too high, which will lead to obvious grain growth in the austenitizing process of the substrate steel sheet and then deteriorate the toughness of the final components;
  2) the low carbon zone of the pre-coated steel sheet. The carbon enrichment zone due to the diffusion which locates in substrate steel sheet and is being near the interface between the final coating and the substrate steel sheet after hot stamping is reduced or counteracted. Then the high-carbon martensite achieved in the carbon enrichment zone can be reduced or avoided during cooling. Hence, the toughness of the final hot stamping components is improved.

The degree of decarburization or carbon enrichment near the interface of substrate steel sheet after hot stamping can be reflected by its hardness or the ratio of hardness to the central of substrate steel sheet. The ratio of hardness should not be too high. If the ratio is too high, it can be referred that there are too many brittle high-carbon martensite microstructure in the substrate steel sheet yet. That is to say, the phenomenon of carbon enrichment is not effectively reduced and this is detrimental to the toughness of the components. If the ratio is too low, it can be referred that the decarburization is serious. Then the hardness of the surface of the substrate steel sheet is low. The tensile strength and VDA peak force will decline significantly. That is to say, the ability of the components to resist tensile and bend deformation also becomes worse. Then the collision safety and lightweight effect of the final components is also influenced. Hence, as for the hot stamping components with different strength, the relationship between the hardness $HV_1$ of the position in the substrate steel sheet where the distance from the interface between substrate steel sheet and coating is less than 6 μm and the substrate steel sheet core hardness $HV_2$ satisfies the following results when the Vickers hardness test was carried out using a load force of 5 g:

as for the hot stamping components whose carbon content is $0.10\% \leq C_0 \leq 0.30\%$ and tensile strength is 1300~1800 MPa, the hardness $HV_1$ of the position in the substrate steel sheet where the distance from the interface between substrate steel sheet and coating is less than 6 μm is 0.65~1.07 time of the substrate steel sheet core hardness $HV_2$ and its value is in the range of 400~550 HV. As for the hot stamping components whose carbon content is $0.30\% < C_0 \leq 0.50\%$ and tensile strength is more than 1800 MPa, the $HV_1$ is 0.6~1.0 time of $HV_2$ and its value is more than 550 HV.

Preferably, as for the hot stamping components with tensile strength of 1300~1800 MPa, the $HV_1$ is 0.7~1.0 time of $HV_2$; as for the hot stamping components with tensile strength more than 1800 MPa, the $HV_1$ is 0.65~0.9 time of $HV_2$.

More preferably, as for the hot stamping components with tensile strength of 1300~1800 MPa, the $HV_1$ is 0.75~0.95 time of $HV_2$; As for the hot stamping components with tensile strength more than 1800 MPa, the $HV_1$ is 0.68~0.85 time of $HV_2$.

The present invention will be described in more detail below with reference to the exemplary embodiments. The following embodiments or experimental data are intended to exemplarily illustrate the present invention, it should be clear to those skilled in the art that the present invention is not limited to these embodiments or experimental data.

The corresponding manufacturing process of the substrate steel sheet with the composition in Table 1 is shown as follows:

a) steel-making: Smelting by vacuum induction furnace, electric furnace or converter according to the composition in Table 1, using continuous casting technology to produce slab, or adopting thin slab continuous casting and continuous rolling process directly;

b) hot-rolling: the steel slab is heated to 1200° C. for 2 hours and hot-rolled at the temperature of 800~1200° C. The pickling is carried out to remove the oxide scale generated during the hot rolling process, and the curling is carried out below 700° C. to form a hot rolled steel coil; and c) the acid-pickled hot-rolled coil is cold rolled; the rolling reduction of the cold rolling is 30~70% to obtain a cold-rolled steel coil of 1.2 mm, 1.4 mm and 1.8 mm.

TABLE 1 the chemical composition (mass percentage, the balance of Fe and other unavoidable impurities)

| Materials | C | Mn | Si | Cr | V | B | Al | Ti | Nb |
|---|---|---|---|---|---|---|---|---|---|
| T1 | 0.23 | 1.18 | 0.22 | 0.16 | — | 0.0025 | 0.034 | 0.04 | — |
| T2 | 0.35 | 1.45 | 0.51 | 0.2 | 0.16 | 0.0019 | 0.56 | — | 0.04 |

Wherein, the T1 is 22MnB5 and the tensile strength of the hot stamping components with this chemical composition is usually 1300~1800 MPa. The T2 is the 35MnB5V, and the tensile strength of the hot stamping components with this chemical composition is more than 1800 MPa. The description of chemical element content in this paper is the mass percentage.

The decarburization of the cold-rolled steel sheet is carried out during continuous annealing process with the atmosphere of 5% $H_2+N_2$ in volume fraction. In order to achieve the different degree of decarburization, the process parameters such as the heat temperature, dew point and duration time is adjusted as shown in Table 2. The hot dipping is carried out when the steel sheet is cooled to the temperature of 610~680° C. Then the thickness of the pre-coated coating is controlled by the air knife and the pre-coated steel sheet with the different thickness of aluminum or aluminum alloy pre-coating is achieved. The composition of the coating solution comprises by weight: 9~12% Si, and the balance of Al or Al alloy and unavoidable impurities.

TABLE 2 surface decarburization process

| Materials | Thickness/mm | Example | Dew point/° C. | Heat temperature/° C. | Duration time/s |
|---|---|---|---|---|---|
| T1 | 1.4 | A0 | −38 | 810 | 120 |
| T1 | 1.4 | A1 | −31 | 810 | 120 |
| T1 | 1.4 | A2 | −25 | 810 | 120 |
| T1 | 1.4 | A3 | −23 | 810 | 120 |
| T1 | 1.4 | A4 | −22 | 770 | 120 |
| T1 | 1.2 | A5 | −22 | 770 | 120 |
| T1 | 1.8 | A6 | −22 | 770 | 120 |
| T1 | 1.4 | BC | −41 | 810 | 120 |
| T1 | 1.4 | B1 | −5 | 810 | 120 |
| T2 | 1.4 | B2 | −39 | 770 | 120 |
| T2 | 1.4 | A7 | −31 | 770 | 120 |
| T2 | 1.4 | A8 | −26 | 770 | 120 |
| T2 | 1.4 | A9 | −22 | 770 | 120 |
| T2 | 1.4 | A10 | −20 | 770 | 120 |
| T2 | 1.4 | A11 | −17 | 770 | 120 |
| T2 | 1.4 | B3 | −5 | 770 | 120 |

The thickness of pre-coated coating of the pre-coated steel sheet is measured by the scanning electron microscope (SEM) and the distribution of carbon content of the position in the substrate steel sheet where the distance from the interface between substrate steel sheet and coating is less than 18 μm is measured by the glow discharge emission spectrometry (GDOES).

Figure 1:
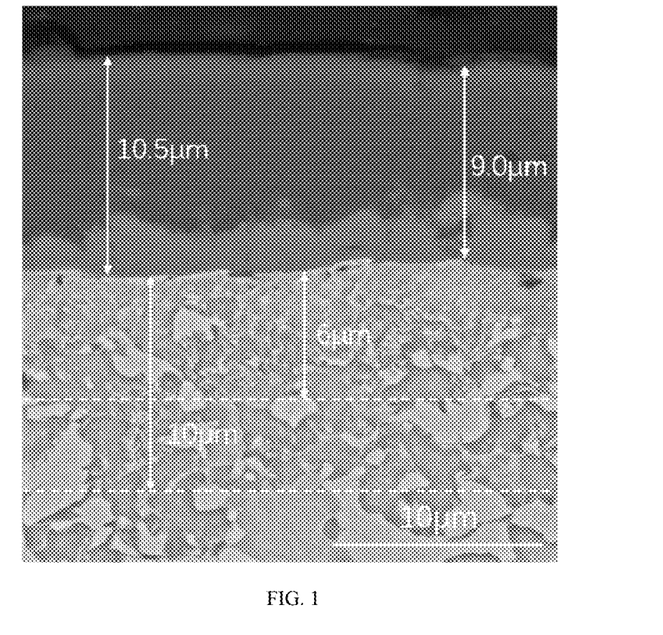
FIG. 1 is the microstructure of the pre-coated steel sheet of T2 composition in Example A8.
Figure 2:
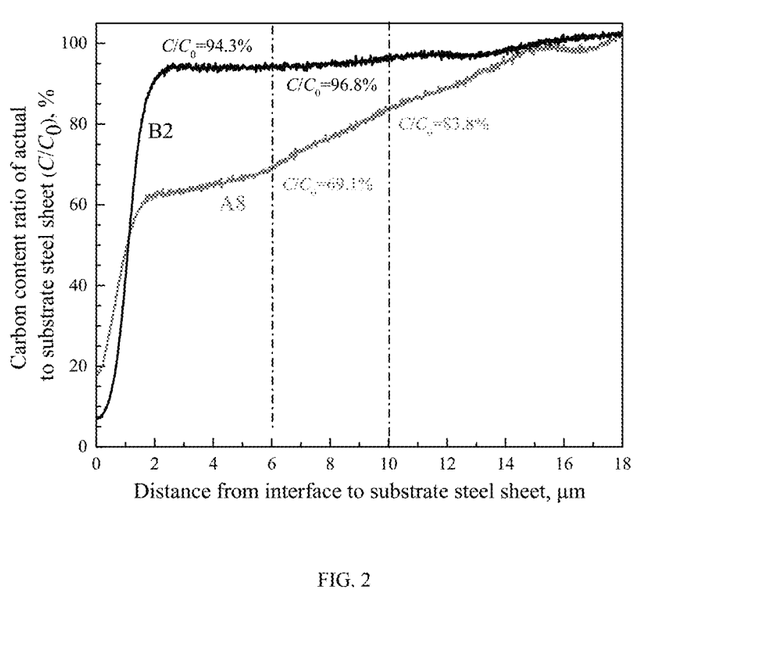
FIG. 2 is the distribution of carbon element of the pre-coated steel sheet of T2 composition in Example A8/B2.

FIG. 1 is the microstructure of the pre-coated steel sheet in Example A8. Wherein, the thickness of the pre-coated is 9.5 μm. FIG. 2 is the distribution of carbon element of the pre-coated steel sheet.

FIG. 2 is the distribution of carbon element of the pre-coated steel sheet of T2 composition in Example A8/B2. The carbon content of the position in the substrate steel sheet where the distance from the interface is 2 μm is about 90% of that of substrate steel sheet $C_0$ as shown in the curve of Example B2, while the carbon content of the position in the substrate steel sheet where the distance from the interface is 2 μm is about 60% $C_0$. As for the position in the substrate steel sheet where the distance from the interface is 6 μm, the carbon content in Example B2 is 93.4% $C_0$ and the carbon content in Example A8 is 69.1% $C_0$. As for the position in the substrate steel sheet where the distance from the interface is 10 μm, the carbon content in Example B2 is 96.8% $C_0$ and the carbon content in Example A8 is 83.8% $C_0$. The carbon content in Example B2 is higher than that in Example A8 and the reason is that the dew point in Example A8 is higher than that in Example B2. Hence, the degree of decarburization is increased and then the initial low carbon zone in Example A8 is thicker than that in Example B2.

Table 3 is the thickness of pre-coated coating and the carbon content of the initial low carbon zone in example.

TABLE 3 the thickness of pre-coated coating and the carbon content of the initial low carbon zone ($C_0$ is the carbon content of the substrate steel sheet)

| Materials | Example | Thickness of pre-coating μm | Carbon content of the position in the substrate steel sheet where the distance from the interface, % $C_0$ | |
|---|---|---|---|---|
| | | | 6 μm | 10 μm |
| T1 | AC | 12.1 ± 2.5 | 95.5 | 98.7 |
| T1 | A1 | 10.6 ± 1.6 | 82.1 | 91.5 |
| T1 | A2 | 11.2 ± 1.1 | 75.6 | 88.4 |
| T1 | A3 | 16.4 ± 1.7 | 72.7 | 87.3 |
| T1 | A4 | 9.3 ± 1.2 | 71.8 | 85.6 |
| T1 | A5 | 9.7 ± 1.4 | 70.9 | 84.5 |
| T1 | A6 | 10.1 ± 0.8 | 72.2 | 85.1 |
| T1 | B0 | 20.7 ± 2.3 | 96.9 | 99.2 |
| T1 | B1 | 11.5 ± 1.7 | 26.7 | 58.9 |
| T2 | B2 | 9.2 ± 0.9 | 94.3 | 96.8 |
| T2 | A7 | 11.2 ± 1.0 | 76.4 | 87.2 |
| T2 | A8 | 9.5 ± 0.7 | 69.1 | 83.8 |
| T2 | A9 | 9.8 ± 1.3 | 64.3 | 80.1 |
| T2 | A10 | 14.9 ± 1.4 | 61.2 | 77.9 |
| T2 | A11 | 10.4 ± 0.5 | 55.3 | 72.6 |
| T2 | B3 | 9.9 ± 0.8 | 24.3 | 54.8 |

It can be seen from the Table 2 and 3 that the carbon content of the position in the substrate steel sheet where the distance from the interface is 6 μm is being at the range of 70.9~95.5% $C_0$ as for the T1 composition with dew point at the range of −38~−22° C. in Example A0~A6. The carbon content of the position in the substrate steel sheet where the distance from the interface is 10 μm is higher than that of the position in the substrate steel sheet where the distance from the interface is 6 μm and is being at the range of 84.5~98.7% $C_0$. The dew point in Example B0 is the lowest and then the degree of decarburization is the lightest. The carbon content of the positions in the substrate steel sheet where the distance from the interface is 6 μm and 10 μm are 97% $C_0$ and 99% $C_0$ respectively. While, the dew point in Example B1 is −5° C. and then the the degree of decarburization is the highest. The carbon content of the positions in the substrate steel sheet where the distance from the interface is 6 μm and 10 μm are about 27% $C_0$ and 59% $C_0$ respectively.

For the T2 composition, in Examples A7-A11, the dew point increases from −31° C. to −17° C., the carbon content at a distance of 6 μm from the interface to the inside of the substrate steel sheet is in the range of 55.3~76.4% $C_0$. At a distance of 10 μm, the carbon content is higher than at 6 μm and in the range of 72.6~87.2% $C_0$. The dew point in Example B2 is −39° C. and the degree of decarburization is slight and the carbon content of the positions in the substrate steel sheet where the distance from the interface is 6 μm and 10 μm are 94% $C_0$ and 97% $C_0$ respectively. At the meantime, the dew point in Example B3 is −5° C. and then the degree of decarburization in the surface is the highest. The carbon content of the positions in the substrate steel sheet where the distance from the interface is 6 μm and 10 μm are about 25% $C_0$ and 55% $C_0$ respectively.

Figure 3:
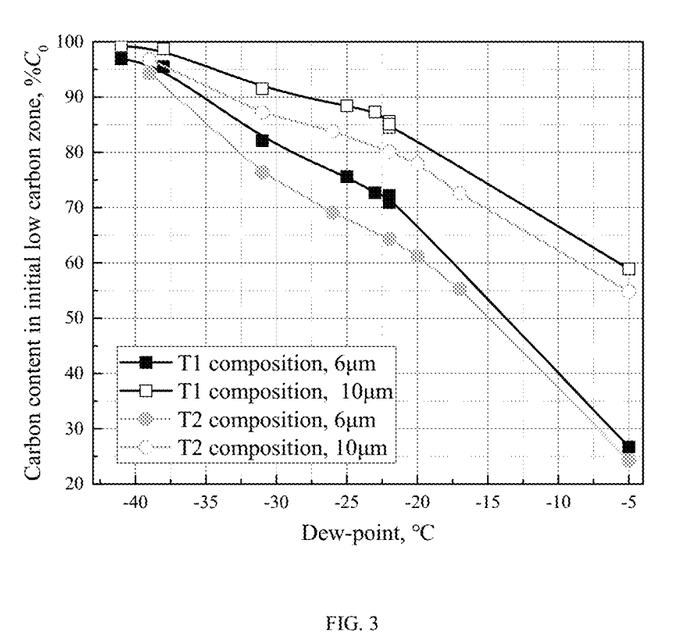
FIG. 3 is the relationship of the dew point and the carbon content in the initial low carbon zone of the pre-coated steel sheet of T1 and T2 composition.

FIG. 3 is the relationship of the dew point and the carbon content of the initial low carbon zone of the pre-coated steel sheet of T1 and T2 composition. It can be seen that with the increasing of dew point, the carbon content in the initial low carbon zone decreases, and accordingly the thickness of the low carbon zone increases, that is, the degree of decarburization increases. At the meantime, since the carbon content of the T2 component is higher than that of the T1 component, the decarburization effect in example of T2 component is more obvious under the same dew point conditions, and the carbon content of the initial low carbon zone of example of T2 component is lower than that of the T1.

The hot stamping simulation of the above-mentioned pre-coated steel sheet is carried out, and the hot stamping process is as follows:

1) the pre-coated steel sheet is heated to 930° C. for 320 s and then the hot stamping is carried out above 700° C. during cooling process. The duration time of hot stamping is 6~10 s. The steel sheet is cooled to below 100° C. in the die and then is taken out.

2) To simulate the actual usage of automobile parts, the steel sheet which is cooled to the room temperature is put into a tempering furnace at 170° C. for 20 min to simulate the baking process of parts, and then is taken out and cool it to room temperature.

the hot stamping component achieved from the pro-coated sheet steel is consisted of the substrate steel sheet and the coating on its outer side. The Vickers hardness of the position near the interface and central zone of substrate steel sheet is measured and the room tensile properties and VDA bending properties of the tempered components are detected.

The Vickers hardness test mothed is as follow: the indenter load force is 5 g and the measured position is the position in the substrate steel sheet where the distance from the interface between the substrate steel sheet and the coating is less than 6 μm and the central of substrate steel sheet. The diagonal length of indentation $d_1$ and $d_2$ is measured by the SEM after the unloading test force. The hardness of the position in the substrate steel sheet where the distance from the interface between the substrate steel sheet and the coating is less than 6 μm and the central of substrate steel sheet can be calculated by the equitation (8) as following:

$$HV = \frac{7.4176 F_{HV}}{(d_1 + d_2)^2}$$

Figure 4:
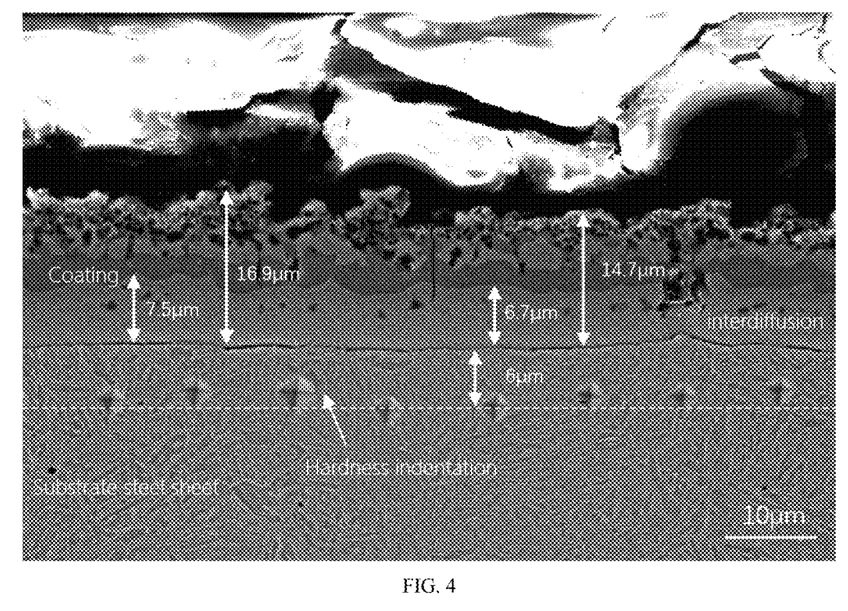
FIG. 4 is the microstructure and partial hardness indentation of hot stamping components obtained from the pre-coated steel sheet of T2 composition in Example A8 after hot stamping.

In order to reduce the measurement error of hardness, the final hardness results are averaged at 10 points. FIG. 4 is the microstructure and partial hardness indentation of hot stamping components with the T2 composition in Example A8 after hot stamping. Wherein, the thickness of coating is about 14.7~16.9 μm and the interdiffusion layer is about 6.7~7.5 μm.

The test method of the room tensile properties and VDA bending properties are in accordance with the GB/T 228.1 Standard and VDA 238-100 Standard, and the direction of the sample is the rolling direction. At the meantime, in order to reduce the measurement error, three groups of samples are selected for tensile properties and VDA bending properties test. The final results are the average values of the three groups.

The method of bending fracture strain is as follow: (1) the VDA bending angle of the sample $\alpha_{peak}$ can be achieved by the static three-point bending test; (2) based on the result, at least three groups of interrupted bending angle $\alpha_L$ (i.e., the bending angle under the load of sample) is used to interrupt the bending test and the $\alpha_L$ is more than 50% $\alpha_L$; (3) when the bending angle reaches the $\alpha_L$, the loading is stopped and the bending angle $\alpha_{UL}$ is measured at the state of unloading; (4) the unloading sample is laid under the optical microscope to measure the inner and outer surface radius $R_i$ and $R_o$ of the most severe deformation zone; (5) the equivalent (plastic) strain $\epsilon$ of the sample outer surface of the most severe deformation zone is calculated at the different $\alpha_{UL}$ unloading state. That is, the equivalent strain $\epsilon$ of the sample outer surface of the most severe deformation zone is calculated when the bending angle reaches the $\alpha_L$, then the relationship of $\epsilon$ and $\alpha_L$ is established. (6) based on the simulation result, the bending fracture strain of the sample is obtained by the extrapolation (i.e., the $\epsilon$ when $\alpha_L$ is equal to $\alpha_{peak}$):

$$\varepsilon = \frac{2}{\sqrt{3}} \ln\left(\sqrt{\frac{R_o}{R_i}}\right)$$

The final results of the Vickers hardness, tensile properties and bending properties is shown in Table 4.

TABLE 4 the relevant measurement parameters of hot stamping components

| Materials | Example | Thickness mm | Hardness of near-surface $HV_1$ | Hardness of central $HV_2$ | $HV_1/HV_2$ | Tensile strength MPa | Elongation % | Bending fracture strain | VDA bending angle ° | VDA Peak force N |
|---|---|---|---|---|---|---|---|---|---|---|
| T1 | A0 | 1.4 | 510.8 | 486.5 | 1.05 | 1558 | 8.6 | 0.294 | 62.8 | 9651.7 |
| T1 | A1 | 1.4 | 457.1 | 481.1 | 0.95 | 1554 | 8.5 | 0.309 | 64.2 | 9673.4 |
| T1 | A2 | 1.4 | 410.2 | 476 | 0.86 | 1538 | 9.1 | 0.313 | 65.3 | 9532.2 |
| T1 | A3 | 1.4 | 401.4 | 483.2 | 0.83 | 1542 | 7.9 | 0.315 | 66.4 | 9479.9 |
| T1 | A4 | 1.4 | 390.7 | 482.5 | 0.81 | 1549 | 6 | 0.311 | 65.7 | 9427.7 |
| T1 | A5 | 1.2 | 391.2 | 480.6 | 0.81 | 1537 | 6.6 | 0.312 | 68.9 | 7303.3 |
| T1 | A6 | 1.8 | 389.5 | 477.3 | 0.82 | 1526 | 7 | 0.313 | 59.6 | 14751.1 |
| T1 | B0 | 1.4 | 543.5 | 485.3 | 1.12 | 1549 | 8.1 | 0.262 | 56.7 | 9073.5 |
| T1 | B1 | 1.4 | 223.9 | 479.1 | 0.47 | 1488 | 8.1 | 0.316 | 66.1 | 8572.9 |
| T2 | B2 | 1.4 | 612.1 | 596.5 | 1.03 | 1923 | 7.3 | 0.201 | 45.4 | 12807.6 |
| T2 | A7 | 1.4 | 553.3 | 595.4 | 0.93 | 1917 | 7.0 | 0.224 | 50.3 | 12527.1 |
| T2 | A8 | 1.4 | 492.8 | 590.4 | 0.83 | 1911 | 7.4 | 0.247 | 53.2 | 12599 |
| T2 | A9 | 1.4 | 454.2 | 588.4 | 0.77 | 1898 | 7.6 | 0.261 | 55.4 | 12385.5 |
| T2 | A10 | 1.4 | 442.7 | 594.7 | 0.74 | 1904 | 6.9 | 0.268 | 57.1 | 12323.2 |
| T2 | A11 | 1.4 | 410.6 | 585.3 | 0.70 | 1892 | 8.8 | 0.272 | 57.7 | 12306 |
| T2 | B3 | 1.4 | 287.3 | 598.1 | 0.48 | 1856 | 7 | 0.278 | 58.3 | 11151.6 |

After hot stamping, the initial low carbon zone narrows or even ceases to exist due to the diffusion between the substrate steel sheet and the pre-coating. Hence, it is very hard to measure the hardness of the initial low carbon zone. The degree of decarburization is reflected by the ratio of the hardness near the interface to the hardness of the central of the substrate steel sheet of the hot stamping components in the present invention (i.e., $HV_1/HV_2$).

Figure 5:
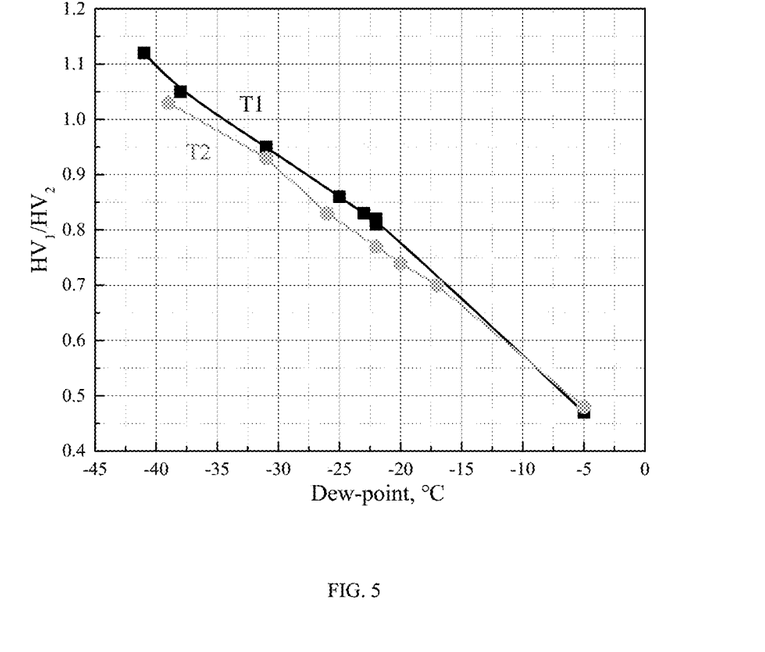
FIG. 5 is the relationship of dew point and the degree of decarburization ($HV_1/HV_2$) in the near-interface zone of the hot stamping components obtained from the pre-coated steel sheet of T1 and T2 composition in Example A8 after hot stamping.

FIG. 5 is the relationship of dew point and the degree of decarburization ($HV_1/HV_2$) in the near-interface zone of hot stamping components obtained from the pre-coated steel sheet of T1 and T2 composition in Example A8 after hot stamping; it can be seen that with the dew point increasing, the ratio of $HV_1/HV_2$ decreases. This is consistence to the situation that the carbon content also decreases with the dew point increases. The $HV_1/HV_2$ ratio is corresponding to the decarburization degree of pre-coated steel sheet.

It is noticed that the ratio of the hardness near the interface to the hardness of the central is 1.05 in Example A0 for the T1 composition. However, the bending angle and the bending fracture strain is elevated to 62.8° and 0.294 respectively. The reason is that the dew point is low and the degree of surface decarburization of the substrate steel sheet is slight. Then the carbon enrichment due to the interdiffusion can be reduced by the slight decarburization and the VDA bending properties is further improved relative to the prior art.

The ratio of the hardness near the interface to hardness of the central is in the range of 0.81~0.95 in Example A1~A4 with the same thickness of 1.4 mm. It means that no carbon enrichment phenomenon is exhibited near the interface between the substrate and coating. It is because the carbon content of the initial low zone is lower in Example A1~A4 than that in Example A0. That is, the degree of decarburization is relatively increased. Then the slight carbon enrichment in Example A0 is further offset. No brittle high-carbon martensite is generated near the interface during the cooling after hot stamping due to no carbon enrichment. Hence, compared with Example A0, the toughness of the components is improved in Example A1~A4. The VDA bending angle is 64.2~66.4° and the bending fracture strain is 0.309~0.315. It can be seen that the slight surface decarburization of the substrate steel sheet can effectively reduce the carbon enrichment caused by the diffusion during hot stamping process. The generated of the brittle high-carbon martensite is reduced and the toughness is improved. The VDA bending angle and the bending fracture strain is also improved. The ratio of the hardness near the interface to hardness of the central is 1.12 in Example B0 and the carbon enrichment phenomenon is obvious. This is because that almost no decarburization in the surface of substrate steel sheet is found due to the low dew point. The carbon enrichment phenomenon cannot be effectively reduced. Hence, the bending properties cannot be improved. The VDA bending angle is 56.7° and the bending fracture strain is 0.262.

As for the T2 composition, the carbon enrichment phenomenon is more sensitive during hot stamping due to the high carbon content in substrate steel sheet. The ratio of the hardness near the interface to hardness of the central is 1.03 in Example B2. The carbon enrichment phenomenon is slight. But the slight carbon enrichment is also disadvantage to the toughness enhancement of hot stamping component in Example B2 due to the high carbon content of T2. So do the results, the VDA bending angle is 45.4° and the bending fracture strain is 0.201. In order to further reduce the carbon enrichment, the degree of decarburization for T2 composition should be improved during pre-coated process. The ratio of the hardness near the interface to hardness of the central is in the range of 0.70~0.93 in Example A7~A11. The corresponding VDA bending angle is improved to 50.3~57.7° and the bending fracture strain is improved to 0.224~0.272. It is illustrated that the effect of carbon enrichment on the toughness of hot stamping components has been eliminated.

Figure 6:
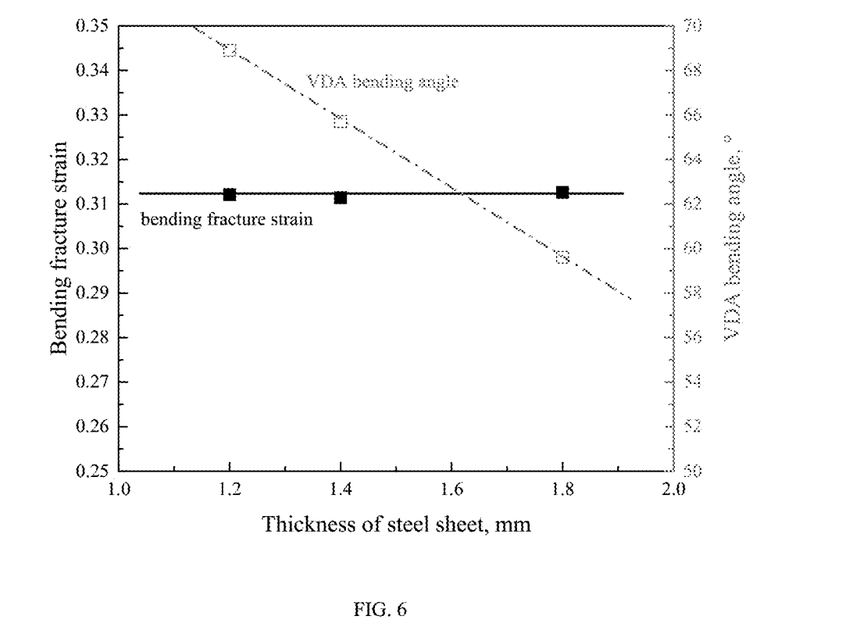
FIG. 6 is the relationship of the bending fracture strain and the VDA bending angle of the hot stamping components obtained from the pre-coated steel sheet of T1 composition with different thickness after the same decarburization and hot stamping and the thickness.

FIG. 6 is the relationship of the bending fracture strain of the hot stamping components obtained from the pre-coated steel sheet of T1 composition with different thickness after the same decarburization and hot stamping and the thickness. It can be seen that as the thickness of hot stamping components increases, the VDA bending angle decreases linearly. But the bending fracture strain remains approximately constant. The reason is that the surface state of the hot stamping components formed from the same material composition and treatment process theoretically is uniform. The outmost surface (i.e., near the surface layer) of the hot stamping components will fracture during VDA bending test. Hence, the bending fracture strain does not change with the thickness of components. So it is reliable to evaluate the collision safety of materials with different thickness by the bending fracture strain.

Figure 7:
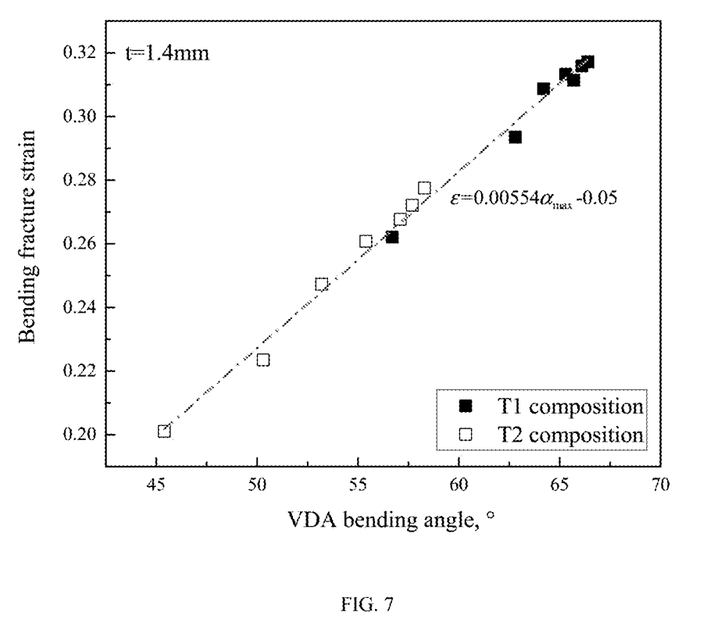
FIG. 7 is the relationship of the bending fracture strain of the hot stamping components obtained from the pre-coated steel sheet of T1 and T2 composition with the thickness of 1.4 mm after hot stamping and the VDA bending angle.

FIG. 7 is the relationship of the bending fracture strain of the hot stamping components obtained from the pre-coated steel sheet of T1 and T2 composition with the thickness of 1.4 mm after hot stamping and the VDA bending angle. The bending fracture strain $\epsilon$ is linear with the VDA bending angle $\alpha_{peak}$ for those two composition hot stamping components with the same thickness. The equation is as follow:

$$\epsilon = 0.00554\alpha_{peak} - 0.05$$

Based on this equation, if $\alpha_{peak}$ is 60°, $\epsilon$ is 0.2824 for the T1 composition. Preferably, if $\alpha_{peak}$ is 63.2°, $\epsilon$ is 0.30. More preferably, if $\alpha_{peak}$ is 65°, $\epsilon$ is 0.31, if $\alpha_{peak}$ is 47°, $\epsilon$ is 0.21 for the T2 composition. Preferably, if $\alpha_{peak}$ is 50.5°, $\epsilon$ is 0.23. More preferably, if $\alpha_{peak}$ is 52.3°, $\epsilon$ is 0.24. Compared with the hot stamping components with T1 composition, both the VDA bending angle and bending fracture strain of the hot stamping components with T2 composition and 1900 MPa tensile strength are low. That is, the toughness will decrease with the increase of strength.

Figure 8:
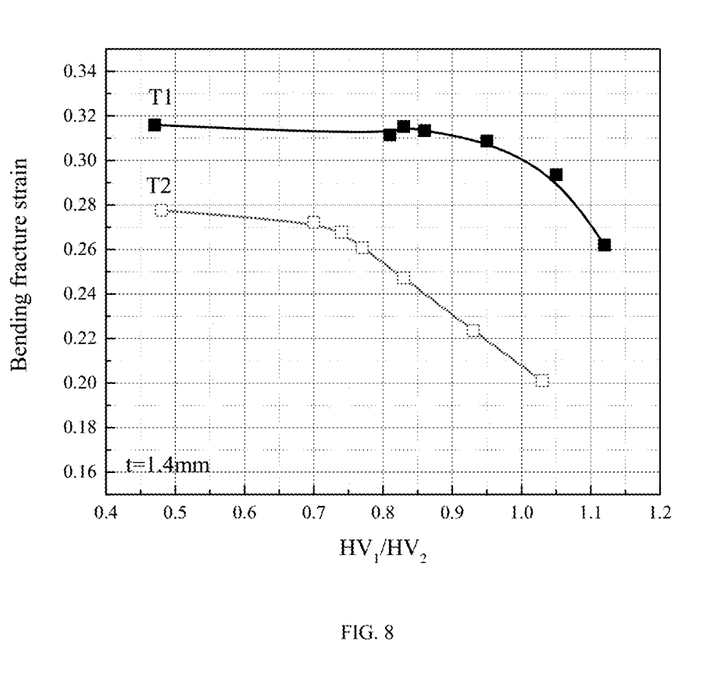
FIG. 8 is the variation of bending strain of the hot stamping components obtained from the pre-coated steel sheet of T1 and T2 composition with the thickness of 1.4 mm after hot stamping as $HV_1/HV_2$ ratio.

FIG. 8 is the variation of bending strain of the hot stamping components obtained from the pre-coated steel sheet of T1 and T2 composition with the thickness of 1.4 mm after hot stamping as $HV_1/HV_2$ ratio. It can be seen that the bending fracture strain of the hot stamping components exhibits the uptrend as the $HV_1/HV_2$ ratio decreases, i.e., the degree of decarburization increases. But the variation trend is gradually slowing down. This is because the bending fracture strain is only related to the near-surface state of the substrate steel sheet. The toughness and plasticity of the near-surface of substrate steel sheet will be improved significantly by decarburization. As for the pre-coated steel sheet with aluminum or aluminum alloy pre-coating, the high-Al interdiffusion layer forms in the surface of the substrate steel sheet after hot stamping. Therefore, no carbon enrichment is formed in the near-surface zone and the good toughness of steel sheet is exhibited. That is to say, the high bending fracture strain is achieved. However, further increase of decarburization in the near-interface zone has little contribution to the improvement of toughness in the near-surface layer, which makes the increase of bending fracture strain limited.

Figure 9:
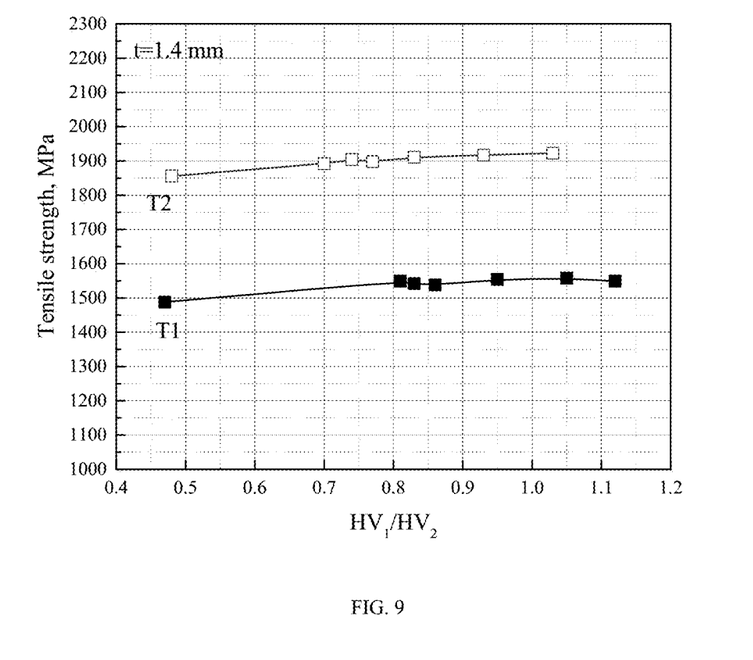
FIG. 9 is the variation of tensile strength of the hot stamping components obtained from the pre-coated steel sheet of T1 and T2 composition with the thickness of 1.4 mm after hot stamping as $HV_1/HV_2$ ratio.
Figure 10:
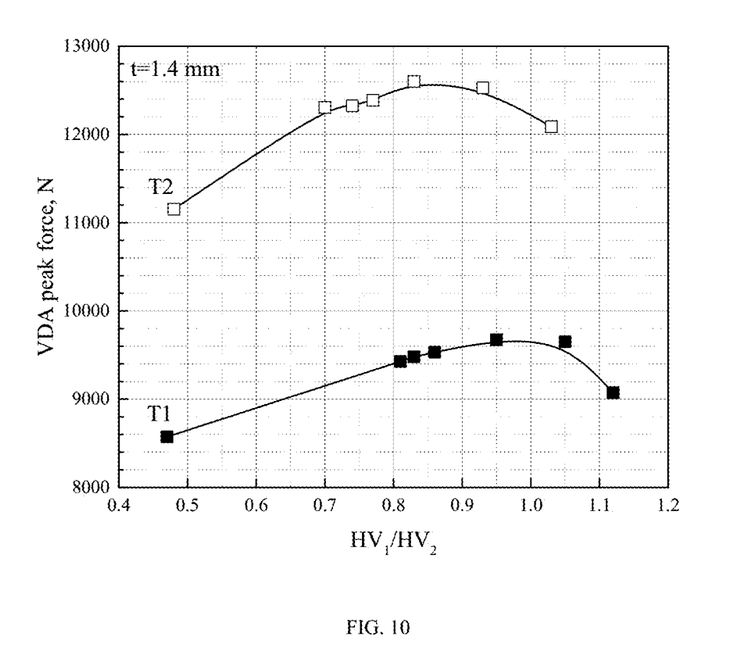
FIG. 10 is the variation of VDA peak force of the hot stamping components obtained from the pre-coated steel sheet of T1 and T2 composition with the thickness of 1.4 mm after hot stamping as $HV_1/HV_2$ ratio.

FIG. 9 and FIG. 10 are the variation of tensile strength and VDA peak force of the hot stamping components obtained from the pre-coated steel sheet of T1 and T2 composition with the thickness of 1.4 mm after hot stamping as $HV_1/HV_2$ ratio. It is noticed that as the $HV_1/HV_2$ ratio decreases, that is, the degree of decarburization increases, the tensile strength of hot stamping components decreases slightly. For example, as for T1 composition, taking Example B0 (dew point is −41° C., from the above data, it is close to no decarburization) as the reference, the $HV_1/HV_2$ ratio is less than 0.5 in Example B1 with the highest decarburization (dew point is −5° C.). Compared with Example B0, its tensile strength is reduced by about 61 MPa, with a decrease of about 3.94%. As for Example A0~A4, the tensile strength decreases by 1% relative to Example B0. The decease of tensile strength can be neglected. In like manner, as for T1 composition, taking Example B2 (dew point is −39° C.) as the reference, the $HV_1/HV_2$ ratio is less than 0.5 in Example B3 with the highest decarburization (dew point is −5° C.). Compared with Example B2, its tensile strength is reduced by about 67 MPa, with a decrease of about 3.48%. As for Example A7~A11, the tensile strength decreases by 2% relative to Example B3. The decease of tensile strength also can be neglected.

Correspondingly, the VDA peak force will exhibit the downward trend with the decrease of $HV_1/HV_2$ ratio (i.e., the thickness of decarburization increases). But before that, it will go through an increasing stage. The detailed explanation is as follow. As for T1 composition, taking Example B0 (dew point is −41° C., from the above data, it is close to no decarburization) as the reference, the VDA peak force does not decreases in Example A0~A4 with slight decarburization ($HV_1/HV_2$ ratio is in the range of 0.81~1.05). This is because the obvious carbon enrichment is exhibited in Example B0 ($HV_1/HV_2$ ratio is 1.12). The brittle high-carbon martensite microstructure formed from the carbon enrichment cracks under low load. Therefore, the failure of sample is present at the early stage. In fact, compared with no complete decarburization, a little carbon enrichment has been eliminated in Example B0. That is to say, the VDA peak force of sample will be lower in the case of no decarburization. Correspondingly, the carbon enrichment is eliminated partially in Example A0, the carbon enrichment is slight and then the VDA peak force increases relative to that of Example B0. The carbon enrichment is eliminated completely in Example A1, so the VDA peak force further increases relative to that of Example A0. The degree of decarburization in Example A2~A4 is elevated with respect to Example A1, however, the VDA peak force gradually decreases with respect to Example A1. This is because the further carbon decarburization will reduce the peak force under the situation which the carbon enrichment has been offset completely. Therefore, when the degree of decarburization is so large that the decrease of VDA peak force caused by decarburization is greater than the increase of VDA peak force caused by eliminating carbon enrichment, the VDA peak force will be lower than that without decarburization. For example, the peak force in Example B1 (dew point is −5° C.) decreases obviously with respect to Example B0. The value decreases by 500N and the decrease is about 5.52%. It is not expected.

Similarly, as for T2 composition, taking Example B2 (dew point is −39° C.) as the reference, the peak force in Example A7~A11 with the low carbon decarburization ($HV_1/HV_2$ ratio is in the range of 0.7~0.93) is elevated with respect to that in Example B0. However, when the degree of decarburization is so large that the decrease of VDA peak force caused by decarburization is greater than the increase of VDA peak force caused by eliminating carbon enrichment, the VDA peak force will be lower than that without decarburization. For example, the peak force in Example B3 (dew point is −5° C.) decreases obviously with respect to Example B2. The value decreases by 936N and the decrease is about 7.74%.

The above experimental data show that the bending force of VDA increases with the increase of decarburization degree under the condition that carbon enrichment is not eliminated completely. In addition, consistent with the previous theory, when carbon enrichment is eliminated, the peak force of VDA will decrease with the increase of the thickness of low carbon zone. However, the decarburization can still improve the VDA peak force under the condition that the decrease of VDA peak force caused by decarburization is not greater than the increase of VDA peak force caused by carbon enrichment, which is completely unrealized by the prior art.

Since the tensile strength and VDA peak force of the hot stamping components will be reduced due to excessive increase of the surface decarburization degree of the substrate steel sheet of the pre-coated steel sheet. In particular with the VDA peak force, it decreases more significantly and then the collision safety and lightweight effect of the final components is also influenced. The VDA peak force must be considered as an important parameter in evaluating the impact safety of hot stamping components. Hence, the present invention proposed that the initial decarburization degree is controlled so that the brittle high-carbon martensite structure can be reduced or eliminated, and the VDA peak force reduction caused by decarburization is not excessively greater than the VDA peak force increase caused by eliminating carbon enrichment, thereby improving the collision safety and lightweight effect of hot stamping components.

In order to ensure collision safety, the components should have high VDA peak force while having high toughness. It can be seen from FIG. 10 that the peak force is no less than 9000N (not less than 98% of the VDA peak force of Example B0 without decarburization) as for the hot stamping component of T1 composition with about 1500 MPa tensile strength and the thickness of 1.4 mm. The ratio of $HV_1/HV_2$ is no less than 0.65. In addition, it can be seen from FIGS. 7~9 and Table 4 that the bending fracture strain should be no less than 0.283, correspondingly, the ratio of $HV_1/HV_2$ is no more than 1.07 if the bending angle of hot stamping components with T1 composition and about 1500 MPa tensile strength and the thickness of 1.4 mm is more than 60°. So the $HV_1/HV_2$ ratio is required to be in the range of 0.65~1.07 in order to make the VDA peak force of the hot stamping components not less than 9000N and the VDA bending angle greater than 60°. In this case, combing with FIG. 5, the dew point should be in the range of −40~−15° C. to meet the expected properties of hot stamping components in present invention. Correspondingly, combing with FIG. 3, the carbon content of the pre-coated steel sheet should satisfy the following situation: the carbon content $C_{1a}$ of the position in the substrate steel sheet where the distance from the interface is 6 μm is content with 53% $C_0 \leq C_{1a} \leq C_0$ and the carbon content $C_{1b}$ of the position in the substrate steel sheet where the distance from the interface is 10 μm is content with 75% $C_0 \leq C_{1b} \leq C_0$, and $C_{1b} > C_{1a}$.

Preferably, if the VDA peak force is required to be no less than 9150N (about 0.84% higher than the VDA peak force of Example B0 without decarburization) as for T1 composition, the $HV_1/HV_2$ ratio should be no less than 0.70. At the meantime, the VDA bending angle is expected to be no less than 63.2°, the bending fracture strain should no less than 0.30, correspondingly, the $HV_1/HV_2$ ratio should be no more than 1.00. So the $HV_1/HV_2$ ratio is required to be in the range of 0.7~1.0 in order to make the VDA peak force of the hot stamping components not less than 9150N and the VDA bending angle no less than 63.2°. Correspondingly, the dew point should be in the range of −35~−17° C. and the carbon content of the pre-coated steel sheet should satisfy the following situation: the carbon content $C_{1a}$ of the position in the substrate steel sheet where the distance from the interface is 6 μm is content with 59% $C_0 \leq C_{1a} \leq 90\% C_0$ and the carbon content $C_{1b}$ of the position in the substrate steel sheet where the distance from the interface is 10 μm is content with 77.5% $C_0 \leq C_{1b} \leq 95\% C_0$, and $C_{1b} > C_{1a}$.

More preferably, if the VDA peak force is required to be no less than 9300N (about 2.5% higher than the VDA peak force of Example B0 without decarburization) as for T1 composition, the $HV_1/HV_2$ ratio should be no less than 0.75. At the meantime, the VDA bending angle is expected to be no less than 65°, the bending fracture strain should no less than 0.31, correspondingly, the $HV_1/HV_2$ ratio should be no more than 0.95. So the $HV_1/HV_2$ ratio is required to be in the range of 0.75~0.95 in order to make the VDA peak force of the hot stamping components not less than 9300N and the VDA bending angle no less than 65°. Correspondingly, the dew point should be in the range of −31~−19° C. and the carbon content of the pre-coated steel sheet should satisfy the following situation: the carbon content $C_{1a}$ of the position in the substrate steel sheet where the distance from the interface is 6 μm is content with 64% $C_0 \leq C_{1a} \leq 82\% C_0$ and the carbon content $C_{1b}$ of the position in the substrate steel sheet where the distance from the interface is 10 μm is content with 80% $C_0 \leq C_{1b} \leq 91.5\% C_0$, and $C_{1b} > C_{1a}$.

Similarly, if the VDA peak force is required to be more than 11800N (not less than 97% of the VDA peak force of Example B2 without decarburization) as for the hot stamping component of T2 composition with about 1900 MPa tensile strength and the thickness of 1.4 mm. The ratio of $HV_1/HV_2$ is no less than 0.6. At the meantime, the VDA bending angle is expected to be no less than 47°, correspondingly, the bending fracture strain should be no less than 0.21 and the $HV_1/HV_2$ ratio is no more than 1.0. So, the $HV_1/HV_2$ ratio should be in the range of 0.6~1.0. Combing with FIG. 5, the dew point should be in the range of −36~−12° C. to meet the expected properties of hot stamping components in present invention. Correspondingly, combing with FIG. 3, the carbon content of the pre-coated steel sheet should satisfy the following situation: the carbon content $C_{2a}$ of the position in the substrate steel sheet where the distance from the interface is 6 μm is content with 42% $C_0 \leq C_{2a} \leq 87\%$ $C_0$ and the carbon content $C_{2b}$ of the position in the substrate steel sheet where the distance from the interface is 10 μm is content with 65% $C_0 \leq C_{2b} \leq 95\%$ $C_0$, and $C_{2b} > C_{2a}$.

Preferably, for the T2 composition, if the VDA peak force is required to be no less than 12000N (not less than 99% of the VDA peak force of Example B2 without decarburization) and the VDA bending angle is expected to be no less than 50.5° as for T2 composition, correspondingly, the bending fracture strain is at least no less than 0.23, and the ratio of HV1/HV2 is in the range of 0.65~0.90. In this case, the dew point should be in the range of −30~−15° C. to meet the expected properties of hot stamping components in present invention. Correspondingly, the carbon content of the pre-coated steel sheet should satisfy the following situation: the carbon content $C_{2a}$ of the position in the substrate steel sheet where the distance from the interface is 6 μm is content with 50% $C_0 \leq C_{2a} \leq 75\%$ $C_0$ and the carbon content $C_{2b}$ of the position in the substrate steel sheet and the carbon content $C_{2a}$ of the position in the substrate steel sheet where the distance from the interface is 10 μm is content with 70% $C_0 \leq C_{2b} \leq 86\%$ $C_0$, and $C_{2b} > C_{2a}$.

More preferably, for the T2 composition, if the VDA peak force is required to be no less than 12200N (about 0.93% higher than the VDA peak force of Example B2 without decarburization) and the VDA bending angle is no less than 52.3°. Correspondingly, the bending fracture strain should be no less than 0.24, and the ratio of HV1/HV2 is in the range of 0.68~0.85. In this case, the dew point should be in the range of −27~−17° C. to meet the expected properties of hot stamping components in present invention. Correspondingly, the carbon content of the pre-coated steel sheet should satisfy the following situation: the carbon content $C_{2a}$ of the position in the substrate steel sheet where the distance from the interface is 6 μm is content with 55% $C_0 \leq C_{2a} \leq 70\%$ $C_0$ and the carbon content $C_{2b}$ of the position in the substrate steel sheet where the distance from the interface is 10 μm is content with 75% $C_0 < C_{2b} \leq 85\%$ $C_0$.

In the end, in order to ensure a high degree of decarburization in the substrate surface of pre-coated steel sheet, the dew point has been elevated to −5° C. in Example B1 and B3. In the actual production process, the oxidation atmosphere in the furnace is serious, and the obvious oxidation color has been in the surface of the substrate steel sheet. In the subsequent coating, there are some problems such as local skip coating and poor coating adhesion, which make the production control difficult and increase the production cost.

In view of the above, The present invention controls the carbon content (i.e. the degree of decarburization) of the initial low carbon zone of the substrate steel sheet of the pre-coated steel sheet by setting an appropriate decarburization process, so that the hot stamping components obtained according to the invention not only has improved toughness, but also has high tensile strength and VDA peak force, thus improving the impact safety of the hot stamping components.

The above embodiments and experimental data are intended to exemplarily illustrate the present invention. It should be clear to those skilled in the art that the present invention is not limited to these embodiments, and various changes can be made without departing from the protection scope of the present invention.

What is claimed is:

1. A pre-coated steel sheet with aluminum or aluminum alloy pre-coating, a total thickness of the pre-coated steel sheet is 0.5~3.0 mm, the pre-coated steel sheet consists of a substrate steel sheet and an aluminum or aluminum alloy pre-coating on the surface of the substrate steel sheet,
   a carbon content Co of the substrate steel sheet is in the range of 0.10~ 0.50% and a manganese content of the substrate steel sheet is in the range of 0.50~10%,
   a pre-coating thickness $w_1$ of the pre-coating is 5~20 μm, wherein an Al content is not less than 60% by mass,
   an initial low carbon zone exists within the substrate steel plate and adjacent to an interface between the substrate steel sheet and the pre-coating,
   (1) as for 0.10% $\leq C_0 \leq 0.30\%$,
      a) a carbon content $C_{1a}$ in the substrate steel sheet at 6 μm from the interface satisfies 55.3% $C_0 \leq C_{1a} \leq C_0$; and
      b) a carbon content $C_{1b}$ in the substrate steel sheet at 10 μm from the interface satisfies 77.5% $C_0 \leq C_{1b} \leq C_0$, and $C_{1b} > C_{1a}$;
   (2) as for 0.30% $< C_0 \leq 0.50\%$,
      a) a carbon content $C_{2a}$ in the substrate steel sheet at 6 μm from the interface satisfies 55% $C_0 \leq C_{2a} \leq 87\%$ $C_0$; and
      b) a carbon content $C_{1b}$ in the substrate steel sheet at 10 μm from the interface satisfies 75% $C_0 \leq C_{2b} \leq 95\%$ $C_0$, and $C_{2b} > C_{2a}$.

2. The pre-coated steel sheet according to claim 1, wherein the total thickness is 0.7~2.3 mm, wherein
   59% $C_0 \leq C_{1a} \leq 90\%$ $C_0$, at the meantime, 77.5% $C_0 \leq C_{1b} \leq 95\%$ $C_0$ and $C_{1b} > C_{1a}$;
   55% $C_0 \leq C_{2a} \leq 75\%$ $C_0$, at the meantime, 75% $C_0 \leq C_{2b} \leq 86\%$ $C_0$ and $C_{2b} > C_{2a}$.

3. The pre-coated steel sheet according to claim 1, wherein the total thickness is 0.8~2.0 mm, wherein
   64% $C_0 \leq C_{1a} \leq 82\%$ $C_0$, at the meantime, 80% $C_0 < C_{1b} \leq 91.5\%$ $C_0$ and $C_{1b} > C_{1a}$;
   55% $C_0 \leq C_{2a} \leq 70\%$ $C_0$, at the meantime, 75% $C_0 < C_{2b} > 85\%$ $C_0$.

4. The pre-coated steel sheet according to claim 1, wherein the substrate steel sheet comprises the following constituents by mass:
   0.10~0.50% C, 0.5~10% Mn, 0~0.01% B, 0~0.4% Nb+Ti+V, 0.01~2% Si, 0.01~2% Al, 0.01~5% Cr+Ni+Mo+Cu and 0~2% Cr, 0~2% Ni, 0~2% Mo and 0~2% Cu, and the balance of Fe and unavoidable impurity elements.

5. The pre-coated steel sheet according to claim 1, wherein the manufacturing method of pre-coated steel sheet comprises:
   a) decarburization: the substrate steel sheet is heated to the first temperature in the range of 740~880° C. in the atmosphere of $H_2$ and $N_2$ with the $H_2$ volume percentage of 2~12%, the duration time is in the range of 30~300 s, wherein the carbon content Co of the substrate steel sheet is in the range of 0.10~0.50% and the manganese content is in the range of 0.50~10%, as for $0.10\% \leq C_0 \leq 0.30\%$, the dew point of the atmosphere should be controlled in the range of $-40 \sim -17°$ C. and as for $0.30\% \leq C_0 \leq 0.50\%$, the dew point of the atmosphere should be controlled in the range of $-36 \sim -17°$ C.;

b) hot dipping: the heated substrate steel sheet is cooled to the second temperature in the range of 610~680° C. and then dipped in the solution of temperature in the range of 610~680° C.;

c) after the substrate steel sheet is out of the coating solution and before the coating solution on the surface solidifies, removing excessive coating solution on the surface by an air knife purge to control the pre-coating thickness $w_1$ on the surface; and d) cooling the steel sheet to room temperature to obtain a pre-coated steel sheet with the aluminium and aluminium alloy pre-coating, wherein the thickness of pre-coating $w_1$ is 5~20 μm, the thickness of pre-coated steel sheet is 0.5~3.0 mm.

6. The pre-coated steel sheet according to claim 5, wherein the first temperature is in the range of 740~880° C., the total thickness is in the range of 0.7~2.3 mm;

as for $0.10\% \leq C_0 \leq 0.30\%$, the dew point of the atmosphere should be controlled in $-35 \sim -17°$ C.;

as for $0.30\% \leq C_0 \leq 0.50\%$, the dew point of the atmosphere should be controlled in $-30°$ C.~$-17°$ C.

7. The pre-coated steel sheet according to claim 5, wherein the total thickness is in the range of 0.8~2.0 mm;

as for $0.10\% \leq C_0 \leq 0.30\%$, the dew point of the atmosphere should be controlled in $-31°$ C.~$-19°$ C.;

as for $0.30\% < C_0 \leq 0.50\%$, the dew point of the atmosphere should be controlled in $-27°$ C.~$-17°$ C.

\* \* \* \* \*